(12) United States Patent
Perry et al.

(10) Patent No.: US 7,089,919 B2
(45) Date of Patent: Aug. 15, 2006

(54) AUTOMOTIVE VAPOR PURGE VALVE USING SHAPE MEMORY ALLOY WIRE

(75) Inventors: Paul D. Perry, Chatham (CA); Andre Veinotte, Dresden (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 11/181,325

(22) Filed: Jul. 14, 2005

(65) Prior Publication Data
US 2006/0011174 A1    Jan. 19, 2006

Related U.S. Application Data

(60) Provisional application No. 60/587,772, filed on Jul. 14, 2004.

(51) Int. Cl.
*F02M 37/04* (2006.01)
*F02M 37/00* (2006.01)

(52) U.S. Cl. ........................ 123/520; 123/516

(58) Field of Classification Search ................ 123/520, 123/516, 519, 198 D; 261/DIG. 67
See application file for complete search history.

(56) References Cited

U.S. PATENT DOCUMENTS

| | | | | |
|---|---|---|---|---|
| 4,577,607 A | * | 3/1986 | Nishio | 123/516 |
| 4,700,682 A | * | 10/1987 | Ota et al. | 123/516 |
| 6,039,030 A | * | 3/2000 | Robinson et al. | 123/457 |
| 6,296,012 B1 | * | 10/2001 | Kilgore et al. | 137/468 |
| 6,772,740 B1 | * | 8/2004 | Kojima et al. | 123/519 |

* cited by examiner

Primary Examiner—Mahmoud Gimie

(57) ABSTRACT

A purge valve is provided for a vehicle. The purge valve 10 includes a body 12 to be coupled to an intake manifold 40 of the vehicle and to a canister 33. The body has an orifice 20 for communicating vapor from the canister 33 with airflow in the intake manifold 40. A valve 18 is movable between a first position closing the orifice 20 and a second position opening the orifice. A shape memory alloy (SMA) structure 31 is associated with the valve such that when electric current is provided to the SMA structure 31 to heat the SMA structure above a transformation temperature thereof, the SMA structure transforms from an original shape to a second shape, thereby causing the valve 18 to move from the first position to the second position, and when the current is removed from the SMA structure, the SMA structure returns to the original shape, thereby permitting the valve 18 to return to the first position.

20 Claims, 2 Drawing Sheets

AUTOMOTIVE VAPOR PURGE VALVE USING SHAPE MEMORY ALLOY WIRE

This application claims the benefit of the earlier filing date of U.S. Provisional Application No. 60/587,772, filed on Jul. 14, 2004, which is incorporated by reference herein in its entirety.

FIELD OF THE INVENTION

This invention relates to fuel vapor containment systems for automotives and, more particularly, to a variable flow purge valve employing a shape memory alloy (SMA).

BACKGROUND OF THE INVENTION

Vehicle emission control typically involves an evaporative emission control system that traps fuel vapors emitted from the fuel tank in a carbon-filled (e.g., charcoal) canister. The evaporative emission control system is periodically purged by drawing fuel vapors from the canister into the engine intake system. In this manner, fuel vapors from the fuel tank are delivered to the engine for subsequent combustion. Thus, the charcoal canister absorbs gasoline vapors emitted by the fuel tank including the vapors generated during re-fueling. A purge valve allows continuous purging of the charcoal canister when the engine is running by controlling a flow of fresh ambient air through the canister and into the intake manifold.

Conventional purge valves regulate the flow rate of fuel vapors introduced into the intake system in response to the pressure difference between the intake manifold and atmosphere. Typical purge valves utilize a pulse width modulated (PWM) solenoid valve that responds to a duty cycle control signal from an engine controller unit (ECU) for selectively establishing and terminating communication between the canister and the intake system. However, the cost of a solenoid purge valve is significant in the overall cost of providing a vapor containment system.

Thus, there is a need to provide a low-cost vapor purge valve for a vapor containment system.

SUMMARY OF THE INVENTION

An object of the invention is to fulfill the need referred to above. In accordance with the principles of the present invention, this objective is obtained by providing a purge valve for a vehicle. The purge valve includes a body constructed and arranged to be coupled to an intake manifold of the vehicle and with a canister. The body has an orifice for communicating vapor from the canister with airflow in the intake manifold. A valve is movable between a first position closing the orifice and a second position opening the orifice. A shape memory alloy (SMA) structure is associated with the valve such that when electric current is provided to the SMA structure to heat the SMA structure above a transformation temperature thereof, the SMA structure transforms from an original shape to a second shape, thereby causing the valve to move from the first position to the second position. When the current is removed from the SMA structure, the SMA structure returns to the original shape, thereby permitting the valve to return to the first position.

In accordance with another aspect of the invention a method is provided for operating a purge valve for a vehicle. The purge valve includes a body coupled to an intake manifold of the vehicle and to a canister. The body has an orifice for communicating vapor from the canister with airflow in the intake manifold. The purge valve includes a valve movable between a first position closing the orifice and a second position opening the orifice. A shape memory alloy (SMA) structure is associated with the valve and is disposed in the intake manifold. The method supplies current to the SMA structure to heat the SMA structure above a transformation temperature of the SMA structure so as to transform the SMA structure from an original shape to a second shape, thereby causing the valve to move from the first position to the second position, permitting vapor from the canister to be exposed to ambient airflow in the intake manifold. The current is removed from the SMA structure so that SMA structure cools in the ambient airflow and returns to the original shape, thereby permitting the valve to return to the first position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PREFERRED EMBODIMENT

This invention relates to the use of Shape Memory Alloys (SMA) in an automotive purge valve application.

A Shape Memory Alloy is an alloy of Titanium and Nickel (TiNi) or Nitinol that manifests two distinct material properties that are dependant on temperature. Below a transformation temperature, SMA alloys are "martensitic" and soft and can be readily deformed. Above the transformation temperature SMA alloys revert to their original shape and assume a high strength "austenttic" state. The alloy temperature can be controlled through resistive heating with electric current giving the ability to use these materials as low cost, high force actuators.

Figure 1:
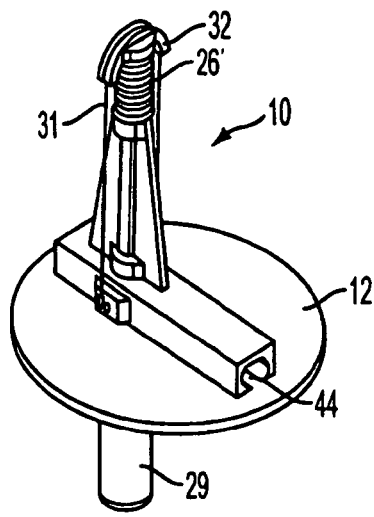
FIG. 1 is a perspective view of a vapor purge valve provided in accordance with the principles of the present invention.
Figure 2:
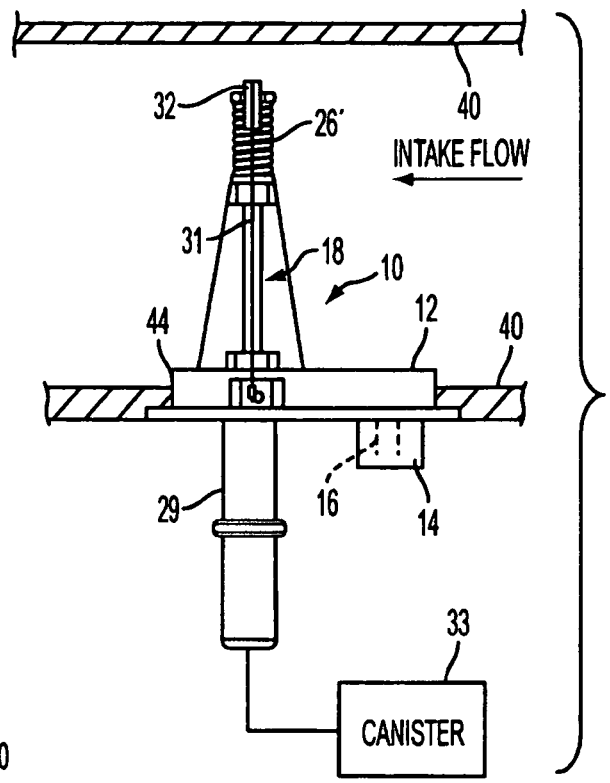
FIG. 2 is side view if the vapor purge valve of FIG. 1 shown mounted in an intake manifold of a vehicle.
Figure 3:
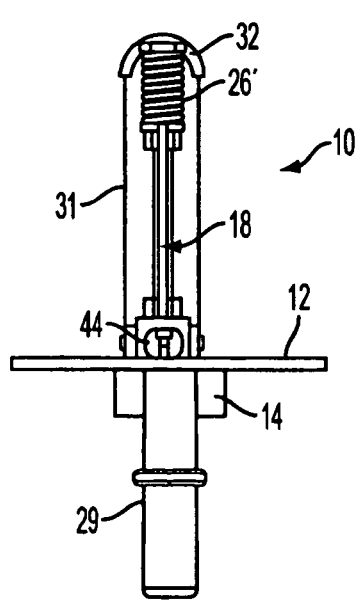
FIG. 3 is an end view of the purge valve of FIG. 1.

With reference to FIGS. 1–3, a purge valve is shown, generally indicated at 10, in accordance with the principles of the present invention. The purge valve 10 includes a body 12 preferably of glass-filled nylon material. The body 12 has a connector 14, with stationary terminals 16 that are preferably insert molded.

Figure 4:
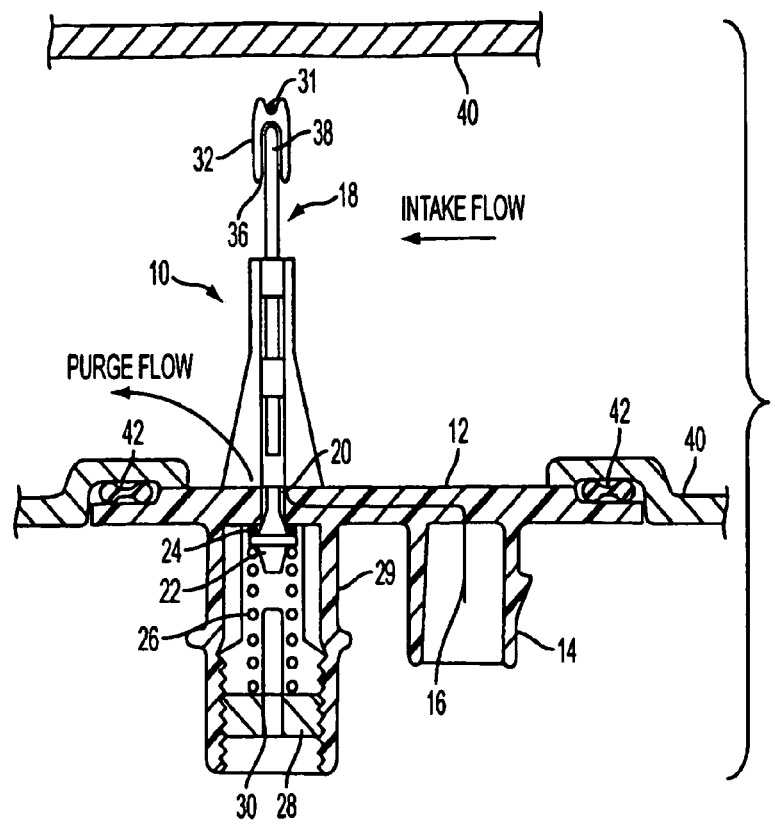
FIG. 4 is a schematic side view of a second embodiment of the purge valve and intake manifold in accordance with the invention, shown in section.

It is noted that the embodiment of the purge valve 10 of FIGS. 1–3 is substantially identical to that of FIGS. 4 and 5, but for the location of a spring 26, and the provision of calibration structure shown in FIG. 4, as will be explained more below. Thus, as best shown in FIG. 4, a valve, generally indicated at 18, is movable within an orifice 20 in the body 12 for opening and closing the orifice 20. In the embodiment of FIG. 4, an end 22 of the valve 18 includes sealing structure, preferably in the form of an O-ring 24. A spring 26 biases the end 22 so that the O-ring 24 seats against the surface of the body 12 surrounding the orifice 20 to seal the orifice 20. Movement of the valve 18 downwardly in FIG. 4, against the bias of the spring 26, unseats the O-ring 24 to open the orifice 20, as will be explained more full below.

Figure 5:
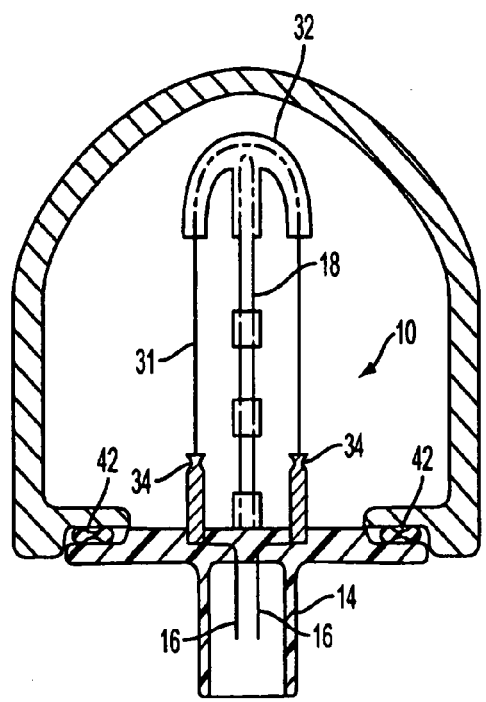
FIG. 5 is an end sectional view of the purge valve and intake manifold of FIG. 4.

In the embodiment of FIGS. 4 and 5, calibration structure, preferably in the form of a nut 28 is in threaded engagement with a connector portion 29 of the body 12. An end of the spring 26 engages the nut so that movement of the nut 28 adjusts the compression of the spring 26 and thus provides calibration of the valve 18. The connector portion 29 is constructed and arranged to be coupled directly or indirectly with a conventional charcoal canister 33 (FIG. 2). The nut 28 includes an opening 30 therein so that vapor from the canister can pass the nut 28 and be directed to the valve 18.

With reference to FIGS. 3 and 5, a generally central portion of SMA structure 31 is disposed over a yoke 32. Each end of the SMA structure 31 is preferably terminated in a crimped connection 34 (FIG. 5) that is connected with an associated terminal 16. The yoke 32, preferably made of glass-filled nylon, includes a pocket 36 (FIG. 4) that receives an end 38 of the valve 18, the function of which will be explained below. The flexible ends of the yoke 32, provide over-stress relief for the SMA structure 31. The SMA structure 31 is preferably a single or dual stand of SMA wire. A dual stand of SMA wire enables more power to be applied thereto.

As best shown in FIGS. 2 and 5, the purge valve 10 is mounted with respect to a conventional intake manifold 40 of a vehicle so that the SMA structure 31 is exposed to the full intake airflow. In the embodiment of FIGS. 4 and 5, the body 12 is mounted to the manifold 40 and is sealed via gaskets or O-rings 42.

When the SMA structure 31 is heated above a transformation temperature with electric current applied to terminals 16, the SMA structure 31 will transform shape by shrinking from an original length to a second, shorter length and pull down on the yolk 32 and thus the valve 18. This movement is enough to unseat the valve 18 (e.g., O-ring 24) and allow purge vapor to pass through orifice 20 in the body 12, allowing the purge vapor to enter the intake flow. When electrical power is removed, the SMA structure 31 is quickly cooled by the intake flow. The spring 26 of FIG. 4 will aid in stretching the SMA structure back its original length, closing the valve 18 and thus reseating the O-ring 24. The spring 26' of the embodiment of FIGS. 1–3 provides the same function as spring 26, since the spring is provided between a portion of the body and the yoke 32, with the yoke 32 being associated with the valve 18.

The electrical power can be applied to terminals 16 in any fashion (i.e. constant current or Pulse Width Modulation etc.) such that the temperature of the wire structure 31 is variable and adjustable. This provides a means of controlling the purge flow in a variable and adjustable fashion.

One safety concern that must be addressed is the exposure of fuel vapor and air to a hot electric SMA structure 31. Also, if the SMA structure 31 were to break, the resulting gap could propagate a momentary spark with enough possibly energy to ignite the gasoline vapor mixture and cause a fire. To eliminate this possibility, the SMA structure 31 is positioned to expose it to the filtered ambient air that is entering the engine intake system. To further enhance the safety of this system, as shown in FIGS. 1–3, a channel or guide structure 44 is provided in the body 12 that routes the gasoline vapor into the flow down stream of the hot SMA structure 31.

A secondary advantage to the construction of the purge valve 10 is the superior cooling afforded by position of the SMA structure 31 in the high volume intake airflow. Large volumes of cooling air will minimize the valve response time. Having the SMA structure 31 in contact with in intake air flow may also allow the valve to meter the purge flow on a constant percent basis relative to the electric power applied. This may allow a purge flow algorithm to be dramatically simplified.

Flow shields (not shown), preferably integral with the body 12 can be associated with the SMA structure 31 to protect the SMA structure 31 against debris in the airflow and to reduce or eliminate resonance.

Since the wire 31 provides the actuation of the valve 18 and is relatively inexpensive, the purge valve 10 provides a cost-effective alternative to the conventional solenoid valves.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A purge valve for a vehicle, the purge valve comprising:
   a body constructed and arranged to be coupled to an intake manifold of the vehicle and to a canister, the body having an orifice for communicating vapor from the canister with airflow in the intake manifold,
   a valve movable between a first position closing the orifice and a second position opening the orifice, and
   a shape memory alloy (SMA) structure associated with the valve such that when electric current is provided to the SMA structure to heat the SMA structure above a transformation temperature thereof, the SMA structure transforms from an original shape to a second shape, thereby causing the valve to move from the first position to the second position, and when the current is removed from the SMA structure, the SMA structure returns to the original shape, thereby permitting the valve to return to the first position.

2. The purge valve of claim 1, wherein the SMA structure is a wire of SMA material, the wire having two ends.

3. The purge valve of claim 2, the purge valve including a yoke, a generally central portion of the wire being provided about the yoke, with each end of the wire being electrically connected with a terminal, the yoke being associated with the valve such that transformation of the wire to the second shape causes the yoke to move the valve to the second position.

4. The purge valve of claim 3, further comprising a spring constructed and arranged, when the current is removed from the wire, to bias the yoke and aid in the return of the wire to the original shape thereof.

5. The purge valve of claim 4, wherein an end of the spring engages the yoke.

6. The purge valve of claim 4, wherein an end of the spring engages the valve.

7. The purge valve of claim 2, wherein the wire is a dual stranded wire.

8. The purge valve of claim 3, wherein the yoke is of flexible material and is constructed and arranged to provide stress-relief to the wire.

9. The purge valve of claim 1, wherein an end of the valve includes sealing structure constructed and arranged to close the orifice.

10. The purge valve of claim 9, wherein the sealing structure is an O-ring.

11. The purge valve of claim 6, further comprising a calibration member associated with the spring to adjust the bias on the end of the valve.

12. The purge valve of claim 11, wherein the calibration member is a nut in threaded engagement with the body.

13. The purge valve of claim 3, in combination with the intake manifold, the purge valve being mounted with respect to the intake manifold such that the yoke and wire extend into the intake manifold so that the wire is exposed to filtered ambient air in the intake manifold.

14. The combination of claim 13, wherein the body includes guide structure constructed and arranged to guide vapor into the ambient air downstream of the wire, when the valve is in the second position thereof.

15. A method of operating a purge valve for a vehicle, the purge valve including a body coupled to an intake manifold of the vehicle, the body being coupled with a canister, the body having an orifice for communicating vapor from the canister with airflow in the intake manifold, the purge valve including a valve movable between a first position closing the orifice and a second position opening the orifice, and a shape memory alloy (SMA) structure associated with the valve and disposed in the intake manifold, the method including:

supplying current to the SMA structure to heat the SMA structure above a transformation temperature of the SMA structure so as to transform the SMA structure from an original shape to a second shape, thereby causing the valve to move from the first position to the second position, permitting vapor from the canister to be exposed to ambient airflow in the intake manifold, and removing current from the SMA structure so that SMA structure cools in the ambient airflow and returns to the original shape, thereby permitting the valve to return to the first position.

16. A purge valve for a vehicle, the purge valve comprising:

a body constructed and arranged to be coupled to an intake manifold of the vehicle and to a canister, the body having an orifice for communicating vapor from the canister with airflow in the intake manifold, means for moving between a first position closing the orifice and a second position opening the orifice, and means for transforming a shape thereof associated with the means for moving such that when electric current is provided to the means for transforming to heat the means for transforming above a transformation temperature thereof, the means for transforming transforms from an original shape to a second shape, thereby causing the means for moving to move from the first position to the second position, and when the current is removed from the means for transforming, the means for transforming returns to the original shape, thereby permitting the means for moving to return to the first position.

17. The purge valve structure of claim 16, wherein the means for transforming is a wire of shape memory alloy material, and the means for moving is a valve.

18. The purge valve of claim 17, further including a yoke, a generally central portion of the wire being provided about the yoke, with each end of the wire being electrically connected with a terminal, the yoke being associated with the valve such that transformation of the wire to the second shape causes the yoke to move the valve to the second position.

19. The method of claim 18, wherein the airflow in the intake manifold is filtered ambient air.

20. The method of claim 17, wherein the body is constructed and arranged to direct the vapor downstream of the SMA structure when the valve is in the second position.

* * * * *